(12) United States Patent
Bartlett

(10) Patent No.: US 6,282,040 B1
(45) Date of Patent: Aug. 28, 2001

(54) WRITE PASS IDENTIFIER

(75) Inventor: Paul Frederick Bartlett, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/249,023

(22) Filed: Feb. 12, 1999

(30) Foreign Application Priority Data

Feb. 12, 1998 (EP) ................................................. 98301019

(51) Int. Cl.[7] ....................................................... G11B 5/09
(52) U.S. Cl. ................................. 360/48; 360/53; 360/31
(58) Field of Search ............................... 714/701, 769, 714/770, 771; 360/48, 53, 31, 60, 13

(56) References Cited

U.S. PATENT DOCUMENTS

| | | |
|---|---|---|
| 4,559,568 | 12/1985 | Watanabe et al. . |
| 4,604,657 | 8/1986 | Fukami et al. . |
| 5,396,374 | 3/1995 | Kubota et al. . |
| 5,450,250 | 9/1995 | Garcia et al. . |

FOREIGN PATENT DOCUMENTS

| | | |
|---|---|---|
| 60122426 | 6/1985 | (EP) . |
| 0 286 412 | 10/1988 | (EP) . |
| 0 297 809 | 1/1989 | (EP) . |
| 0 321 977 | 6/1989 | (EP) . |
| 0 535 920 A2 | 4/1993 | (EP) . |

Primary Examiner—Alan T Faber (57) ABSTRACT

A method of encoding data to distinguish between new data and incompletely erased old data when restoring the data from a magnetic tape storage device comprises: arranging a byte stream of user data into a plurality of track blocks; adding to each track block a track block header containing a write pass identifier; as the data are written to tape, the write pass identifier of the data already on tape is read and the write pass identifier of the data being written to tape is incremented.

13 Claims, 8 Drawing Sheets

Fig. 1

| Physical Track Number (Band, Track) | Physical Group Number |
|---|---|
| Data Track Band 201 | 1,0<br>1,1<br>1,2<br>1,3<br>1,4<br>1,5<br>1,6<br>1,7 | 0<br>0<br>0<br>0<br>0<br>0<br>0<br>0 |
| Data Track Band 202 | 2,0<br>2,1<br>2,2<br>2,3<br>2,4<br>2,5<br>2,6<br>2,7 | 0<br>0<br>0<br>0<br>0<br>0<br>0<br>0 |
| Data Track Band 203 | 3,0<br>3,1<br>3,2<br>3,3<br>3,4<br>3,5<br>3,6<br>3,7 | 0<br>0<br>0<br>0<br>0<br>0<br>0<br>0 |
| Data Track Band 204 | 4,0<br>4,1<br>4,2<br>4,3<br>4,4<br>4,5<br>4,6<br>4,7 | 0<br>0<br>0<br>0<br>0<br>0<br>0<br>0 |

1st Transverse Direction ↓   2nd Transverse Direction ↑

WRITE PASS IDENTIFIER

FIELD OF THE INVENTION

The present invention relates to data storage devices and particularly although not exclusively to a method of writing data to include data dropout protection in a linear tape data storage device.

BACKGROUND TO THE INVENTION

In order to store digital electronic data it is known to use magnetic tape data cartridges, which are inserted into a tape drive unit having a plurality of read/write heads. Typically, such magnetic tape storage devices may be used to back up data generated by a host device, eg a computer.

In the conventional tape drive, electronic circuitry is provided to encrypt the digital data to be stored, using an algorithm which applies redundancy encryption to the original digital data, so that the data recorded onto the magnetic tape incorporates redundant data from which the original data can be recovered if there is corruption of the data recorded on tape. Such corruption may occur for a variety of reasons, for example, at the edges of the tape due to non-uniform coating of the tape with magnetic material, or due to variations in alignment of the tape with the read/write head. In such cases, on reading the data, areas of corruption are detectable because the data is absent or a usable data signal is indistinguishable in a read signal produced by a read head.

However, another situation where corruption of data can arise and which requires the use of encryption for its correction is where a tape is overwritten and old pre-recorded data from a previous write operation has not been completely erased. This can occur if the tape momentarily loses contact with the read/write head and the new data has not been written over the old. This condition is known as a "data drop out". It is possible that, when the data is subsequently read from tape, old incorrect data could be returned to the host. Since the old data read is present, and may be uncorrupted, it may be mistaken for the correct data which was intended to overwrite the old pre-recorded data.

As the density of data stored on tapes increases and the physical size of tape tracks decreases then the need to correct data dropout defects becomes more important, because increasingly larger amounts of pre-recorded data may fail to be over-written.

A further problem in linear tape data storage devices is identifying where a set of recorded data ends on the tape. Where a new set of data has been overwritten over old pre-recorded data, over a length of tape, the old pre-recorded data, which was written in a same general format as a set of new data overwriting the pre-recorded data, needs to be distinguished from the new data, in order to avoid reading the old data, and mistaking it for new data.

SUMMARY OF THE INVENTION

Specific embodiments and methods according to the present invention aim to improve the detection of data dropouts when reading data from high data density tape systems, and thereby improve reliability of such devices.

Specific methods according to the present invention, recognize that if a most recently written data on a tape can be uniquely identified, then old pre-recorded data, which may be incompletely overwritten by the new data, may be recognized and discarded by a data reading device.

According to a first aspect of the present invention, there is provided a method of writing data to a data storage medium, said method comprising the steps of:

performing a write operation to write data to said data storage medium; and for each said write operation, writing an identifier data to said data storage medium, said identifier data uniquely identifying said write operation.

Data is written in sets of data blocks, and an end of a said set of data blocks is marked by recording an end of data indicator. When data is written to the data storage medium such that this causes existing pre-recorded data on the data storage medium to be overwritten, then unless the write operation starts at an existing end of data indicator field recorded on said data storage medium, a value of the identifier data is incremented. Preferably the value of the identifier is incremented above a value of an existing identifier data associated with the existing pre-recorded data on the data storage medium.

Preferably, said data storage medium comprises an elongate tape, and a said write operation comprises a write pass along a length of said tape.

Said method may comprise performing a plurality of said write operations in a sequence, wherein for each said write operation a corresponding respective unique said identifier data is assigned, identifying said write operation.

The data written by a first said write operation having a first said identifier data may be overwritten by a second said write operation having a second said identifier data, wherein said second identifier data is incremented in value with respect to said first identifier data.

Preferably, said written data is partitioned into a set of data blocks, and a said identification data is included in each said data block.

The invention includes a tape data storage device capable of writing data to a tape data storage medium, wherein:

said device is operable to perform a write operation to write data to said tape data storage medium; and for each said write operation, said device is operable to write an identifier data to said data storage medium, said identifier data identifying said write operation.

Where the device writes data to a data storage medium which has existing pre-recorded data, and the writing of the data causes the existing pre-recorded data to be overwritten, unless the write operation starts at an existing indicator indicating an end of the pre-recorded data on the data storage medium, then the value of the identifier data of the written data is incremented compared to a previous value of said identifier data.

According to a second aspect of the present invention there is provided a method of formatting data recorded on a data storage medium so as to include information relating to a vintage of said data, said method comprising steps of:

arranging a byte stream of data into a plurality of data blocks; and adding a data block header to each said data block, wherein said data block header uniquely identifies a vintage of said recorded data.

suitably, on an occasion that data is written to the data storage medium which causes existing pre-recorded data on the data storage medium to be overwritten, an identifier data field within the data block header is incremented. The increment is made relative to a previous value of said identifier data.

Preferably, said step of adding a data block header to each said data block comprises:

creating an identifier field within said data block header; and incrementing or changing said identifier field when data is written to said data storage medium.

Said write pass indicator may be incremented whenever a write operation causes pre-recorded data to be overwritten.

Said identifier field preferably contains data identifying a write pass operation.

Preferably, said data storage medium comprises a magnetic tape.

The invention includes a method of encoding data written to tape so as to distinguish over-write data from pre-recorded data, said method comprising the steps of:

reading a first write pass identifier of said pre-recorded data already recorded on tape;

arranging a byte stream of said overwrite data into a plurality of data blocks;

to each data block, adding a block header containing a second write pass identifier identifying a write operation in which said data is over-written on said pre-recorded data, wherein said second write pass identifier of said overwrite data is incremented compared to said first write pass identifier of said pre-recorded data.

The invention includes an encoding device capable of encoding data written to tape so as to distinguish overwrite data from pre-recorded data, wherein said encoding device comprises:

means operable to read a first write pass identifier of said pre-recorded data already recorded on tape;

means operable to arrange a byte stream of said overwrite data into a plurality of data blocks;

means operable to add a block header to each data block, said block header containing a second write pass identifier identifying a write operation in which said data is overwritten on said pre-recorded data, wherein said second write pass identifier of said overwrite data is incremented compared to said first write pass identifier of said pre-recorded data.

According to a third aspect of the present invention there is provided a method of reading data from a tape data storage medium, said method comprising the steps of:

reading a stream of said data from said tape data storage medium;

continuously monitoring an identifier data embedded in said read data;

determining whether a change in vintage value of said continuously monitored identifier data occurs; and accepting any said data associated with a currently read said identifier data having a same or more recent vintage value to a previously read said identifier data.

Preferably the stream of data is monitored for locating an end of data indicator.

Said method may further comprise the steps of determining whether a currently read data identifier has an earlier vintage value, compared to said previously read identifier data; and depending on a result of said determination, activating a data recovery from a redundancy encryption in said data.

If said currently read data identifier has an earlier vintage value compared to said previously read identifier data, then if an end of data indicator has been found for said stream of data indicating an end of said previously read data, then reading said stream of data from said data storage medium may be terminated.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Specific methods according to the present invention as described herein are aimed at magnetic tape recording devices having a substantially static read/write head in which an elongate tape is drawn past the head at relatively high speed, for example of the order of 3 metres per second. Reading and writing of data onto the tape may be carried out in both forward and reverse pass directions of the tape relative to the head, and a plurality of parallel data tracks may be read or recorded onto the tape simultaneously, using a read/write head comprising a plurality of spaced apart read/write elements. However, the general methods disclosed and as identified in the claims herein, are not limited to static head devices or devices having high tape speeds.

Figure 1:
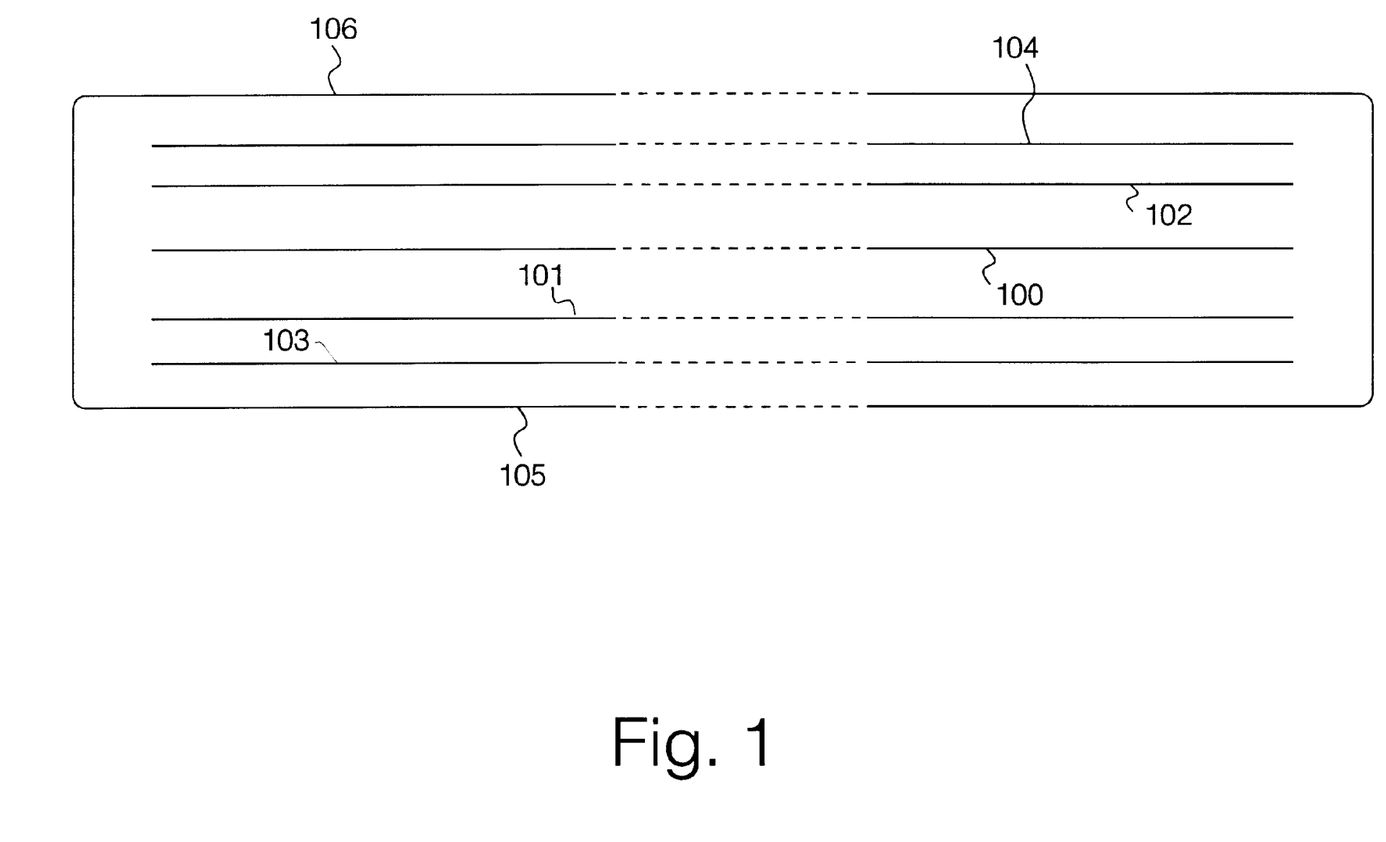
FIG. 1 illustrates schematically a plurality of paths taken by a read/write head relative to an elongate band of magnetic tape material according to a specific method of the present invention.

Referring to FIG. 1 herein, there is illustrated schematically a physical layout of data recorded along an elongate band of magnetic tape by a read/write head of a magnetic data recording device as the tape is drawn past the head according to a specific method of the present invention. The read/write head contains a plurality of read elements and a plurality of write elements arranged to read or write a plurality of physical tracks of data along the tape simultaneously, resulting in physical tracks 100, 104 which are recorded parallel to each other along a length of the tape. The plurality of read/write elements are spaced apart from each other in a direction transverse to the direction of the movement of the tape, typically by distance of the order 200 $\mu$m. Each read/write element is capable of reading or writing a physical track of width of the order 20 $\mu$m or so. The read/write head records a plurality of band routes along the tape in a path shown in FIG. 1 herein. Each band group contains a plurality of bands, each band comprising a plurality of physically recorded data tracks. Substantially a complete length of the tape is wound past the static read/write head in a single pass.

Ideally, the tape winds itself its whole full length from a first end to a second end of the tape during a "pass" of the tape past the read/write heads. In this specification a "write pass" is defined as a single passage of the tape past a write head for writing onto a single track, irrespective of whether the tape speed varies, or whether the tape stops during the pass. During a back up operation, the tape may traverse the read/write head in forward and reverse directions a number of different times, in a plurality of different write passes. A write pass may comprise a sequence of writes which cause data to be written sequentially along one or more tracks, which are themselves written in sequence.

Figure 2:
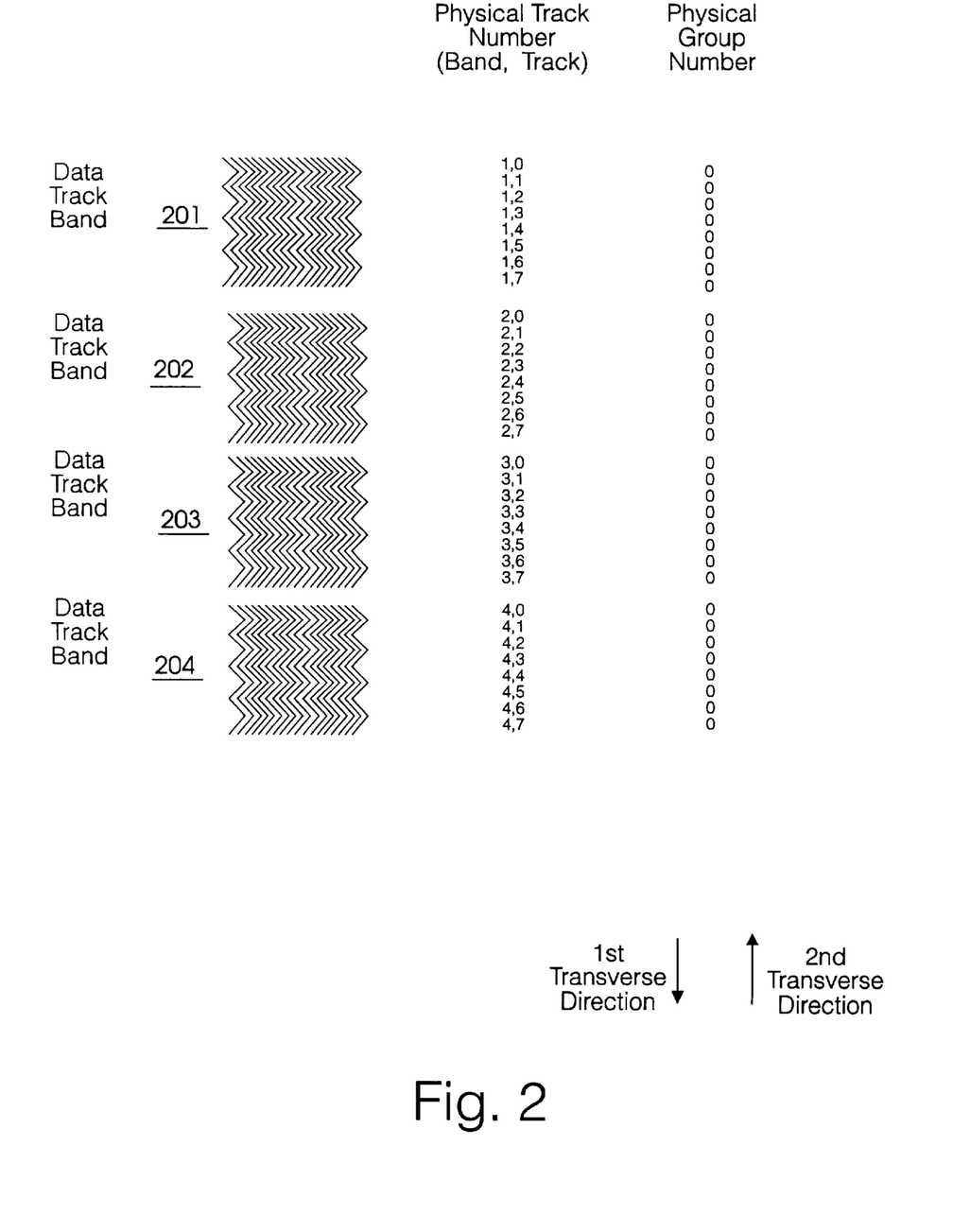
FIG. 2 illustrates schematically a layout of a band group comprising a plurality of physical data tracks recorded onto a magnetic tape data storage medium according to a specific method of the present invention.

Referring to FIG. 2 herein there is shown schematically a layout of a single band group (initial band group 0) along the tape. Each band group comprises a plurality of number N data track bands 201–204 onto which are recorded data. In the case of FIG. 2 there are four data track bands per band group. Each data track band comprises a plurality M of individual data tracks, each track recording a channel of digital data. In the case of FIG. 2, there are shown 8 tracks per data track band and 32 data tracks per band group. The tape moves across the static read and write elements reading and or recording one track per data track band of a band group in a single pass. Thus, using the example of a four data track band group, one track of each of four bands, ie first track 0, may be recorded at the same time. The read/write head is moved across the tape a short distance, of the order 20 $\mu$m in a first transverse direction, transverse to the main length of the tape, to line with the second track (track 1) of each data track band and reading/writing the second track of each band occurs in parallel in a second pass.

Subsequently, the read/write head is further moved across the tape in the same transverse direction, a further 20 $\mu$m and a third track of each data track band (track 2) is recorded, and so on, until all 8 tracks of each band are recorded, at which point the group is fully recorded.

Data is arranged into logical tracks, which are then recorded onto the tape as the physical tracks as shown in FIG. 2. Using an example of writing initial band group 0 comprising bands 200–204 (band numbers 0–4) in FIG. 2, data is written along the band group. In a head arrangement of four read/write elements, the four physical tracks (1,0; 2,0; 3,0; 4,0) are recorded and/or read simultaneously in parallel from the first end of the tape to the second end of the tape.

Where a track, to which data has already been written (herein called pre-recorded data) is subsequently re-written with new data during a subsequent pass, there is the risk that the subsequently recorded data may be incompletely recorded along the length of the tape. This may occur, for example, due to a particle of dust or dirt entering between the tape and the write head. Under these circumstances, there may be a first physical length of track recorded with the new data, followed by a physical length on the track in which the pre-recorded data remains, followed by a further physical length along the track where the new data is recorded. On reading the new data, an output from a read head would produce new data, followed by a burst of the pre-recorded data, followed by the new data.

According to the best mode herein, data is encoded prior to writing to tape, such as to include an identification data which distinguishes between old (pre-recorded) data written in a previous pass of the tape past a write head, and new data recorded in a subsequent new pass of the tape relative to a write head.

The method of encoding will now be described with reference to FIGS. 3 to 7 herein. It will be understood that the inclusion encoding of write pass identification data is made in addition to encoding of the data for other reasons, eg encryption, redundancy. The specific method according to the present invention may be carried out independently of this other encoding in the general case. In the best mode for carrying out the invention as described in the specific implementation herein, inclusion of data with an identification data indicating a vintage of the write pass is combined with other tape drive operation data in a header which is pre-pended to data blocks of encoded user data received from a host apparatus.

Figure 3:
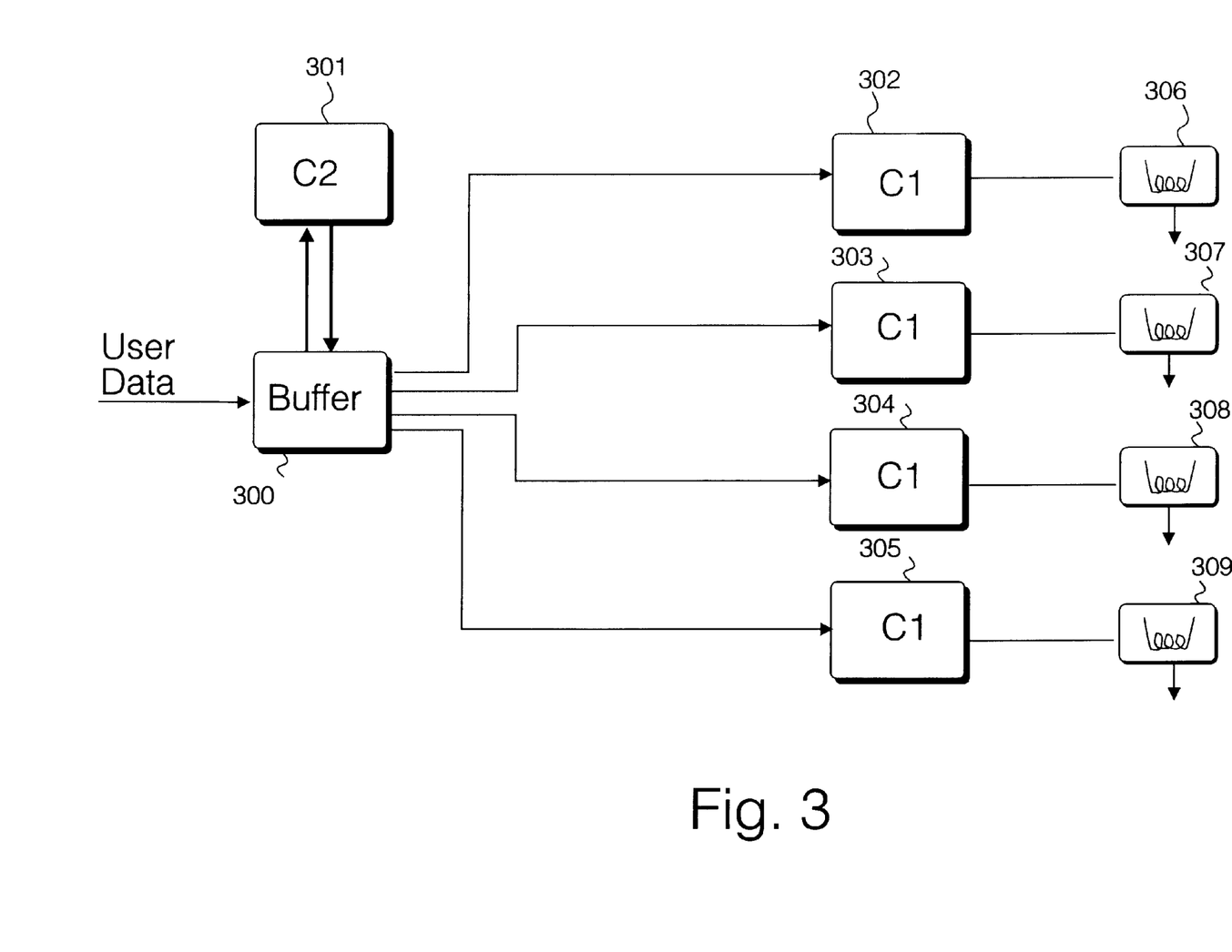
FIG. 3 illustrates schematically a data encoding apparatus for redundancy coding a byte stream of user data received from a host apparatus prior to recording the user data onto a magnetic tape storage medium according to the specific implementations of the present invention.

Referring to FIG. 3 herein, there is illustrated an encoding apparatus for encoding user data prior to recording the user data onto a plurality of physical data tracks as described hereinbefore. The apparatus comprises an input buffer 300 for storing a plurality of data frames; a C2 redundancy coding processor 301 for employing a second (C2) redundancy coding algorithm to a plurality of data sets; first to fourth C1 encoding processors 302–305 for applying a first C1 redundancy coding algorithm to the C2 encoded data sets, and first to fourth read/write elements 306–309 for recording the C1 and C2 data frames onto four separate physical tracks along a length of magnetic tape storage medium. Typically, the encoding apparatus comprises an application specific integrated circuit (ASIC) configured as redundancy coding processors operating C2 and C1 redundancy coding algorithms respectively. The buffer 300 may comprise a separate random access memory having a capacity capable of storing a plurality of data frames, and a buffer may communicate with the C1, C2 coding processor at a data rate of the order 80 MHz.

Figure 4:
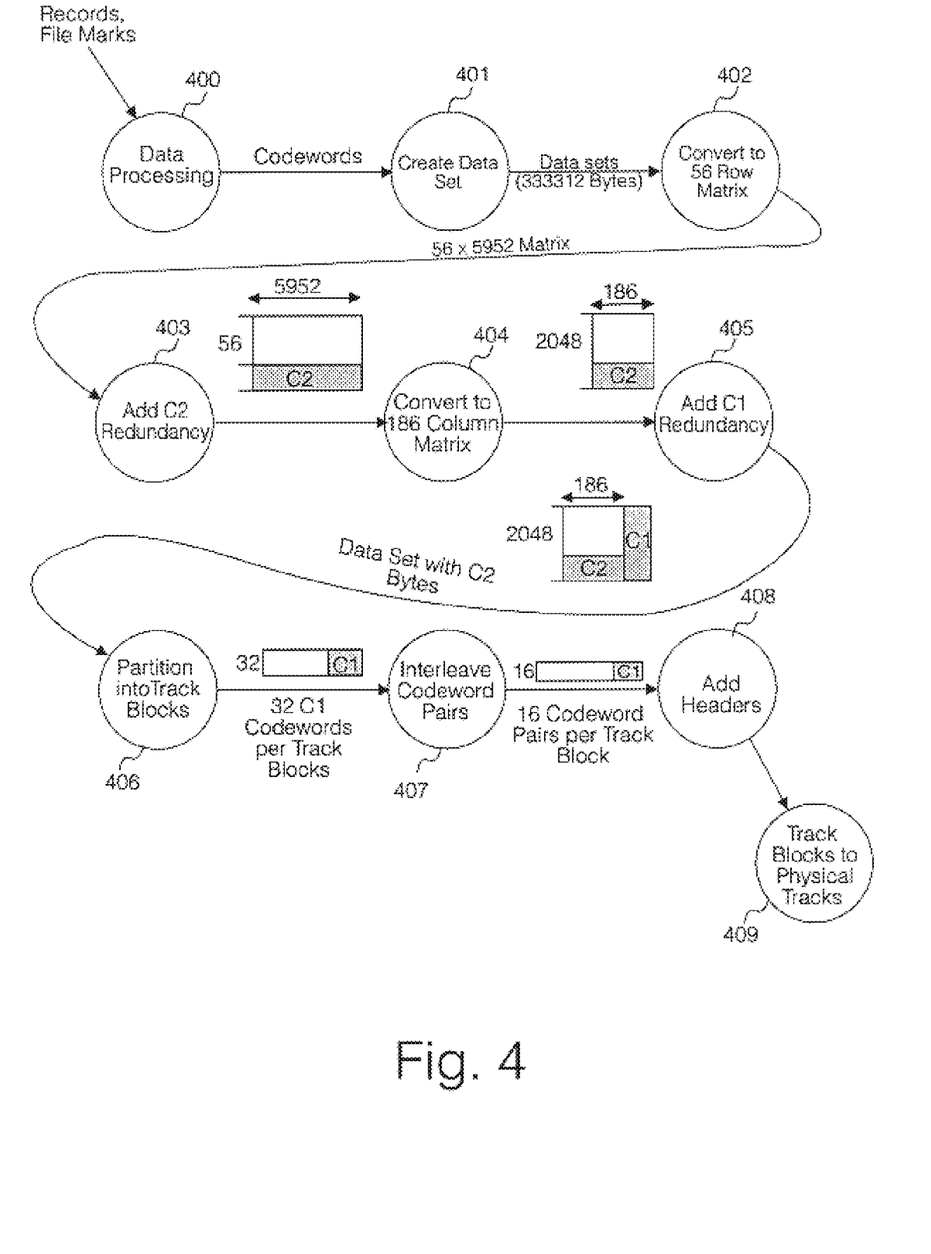
FIG. 4 illustrates schematically in general overview the process for redundancy coding and recording a byte stream of data from a host apparatus onto a magnetic tape data storage medium according to a specific implementation of the present invention.

Referring to FIG. 4 herein, there is illustrated schematically an overall process operated by the apparatus for FIG. 3 in order to record C1 and C2 encoded user data in a series of track blocks onto a magnetic tape data storage device as hereinbefore described. Operation of the apparatus in FIG. 3 in accordance with the method of FIG. 4 will now be described.

A byte stream of user data is input into input buffer 300. The user data is partitioned into a set of records, each having a four byte cyclical redundancy code, for protecting the record. The cyclical redundancy code may be checked when data is recovered during a read operation of the user data. During a read operation, inspection of the cyclical redundancy code is used to verify that the user data in the record has not been corrupted during storage on the tape. In step 400, data processing of the user data comprises generating a stream of user data words based on the sequence of protected records and file marks issued by the host apparatus which originates the data. The purpose of the data processing step 400 is to remove redundancy from the incoming user data string. In step 401 a user data set of fixed length is created by grouping a predetermined number of the processed user data words resulting from step 400. Data sets are created having a fixed length of 333,312 bytes. In step 402, each user data set is converted into a two dimensional matrix having 56 rows and 5952 columns. In step 403, a second (C2) level of redundancy error correction coding is after the 56 row×5952 column matrix of user data. The C2 error correction coding scheme comprises a known Reed-Solomon error correction coding scheme. An interleave used by the C2 redundancy coding scheme may be one C2 symbol every 32 first codewords, ie one C2 symbol every 32 rows of 186 bytes of user data, or equivalently, one C2 symbol every 5952 bytes of user data. The C2 redundancy coding is based on a Reed-Solomon code (64, 56, 9). Reed-Solomon coding is well known in the prior art. In step 404, the data set with added C2 redundancy coding is converted into a second matrix format having 186 columns and 2048 rows. Where a second redundancy coding C2 having 12½% redundancy is utilised, 256 rows of data may comprise the C2 redundancy coding data, the data set comprising 1792 rows. In step 405, first redundancy coding C1 is applied to the second data matrix. The first redundancy coding is applied orthogonally to the second redundancy coding. That is to say, a first codeword intersects a second codeword just once, and there is only one common byte between them. Each first codeword consists of 186 bytes of processed user data, followed by 6 bytes of C1 redundancy coding symbols or 186 bytes of C2 coding and 6 bytes of C1 coding. The C1 redundancy coding is based on a Reed-Solomon code of (192, 186, 7).

In step 406, the two dimensional data frame comprising the data set having first and second redundancy coding added is partitioned into a plurality of logical track blocks. The data frame is divided into 64 equal logical track blocks of data. This equates to 32 first codewords in each tack block or one C2 symbol from each C2 codeword in each track block. In step 407, the first codewords in the track blocks are interleaved in pairs. This transformation is performed by taking two consecutive codewords at a time, and interleaving them together into one pair of first codewords. This results in 16 first codeword pairs per track block. In step 408, headers are added to the track blocks to each of the first codeword pairs within the track blocks. The headers are used to contain position information and identification of the data record in the track block. In step 409, a plurality of track blocks are allocated to physical tracks in such a way that the nth track block is allocated to a track P where P=n|M| and M is the number of logical data track per physical track block set.

The data processing method described hereinabove with reference to FIGS. 3 and 4 provides a recovery mechanism for recovering data from an over-write write pass, where a "data drop-out" occurs where the tape lifts away from the write head during a write operation. Initiation of a recovery operation, using the encryption redundancy coding as described above is triggered by monitoring of an identification data (a write pass indicator) which is included in both the pre-recorded data and the over-written data as is described hereinafter.

Another use of the write pass identifier is to detect when a data block has not been correctly written to tape. Prior art read after-write methods check the correctness of data (using C1). However, by use of the write pass identifier to determine whether a block is an old "correct" data block or a new one, if the data block is old (ie pre-recorded) then an appropriate recovery algorithm may be invoked to ensure that the new data block is correctly written to tape.

Figure 5:
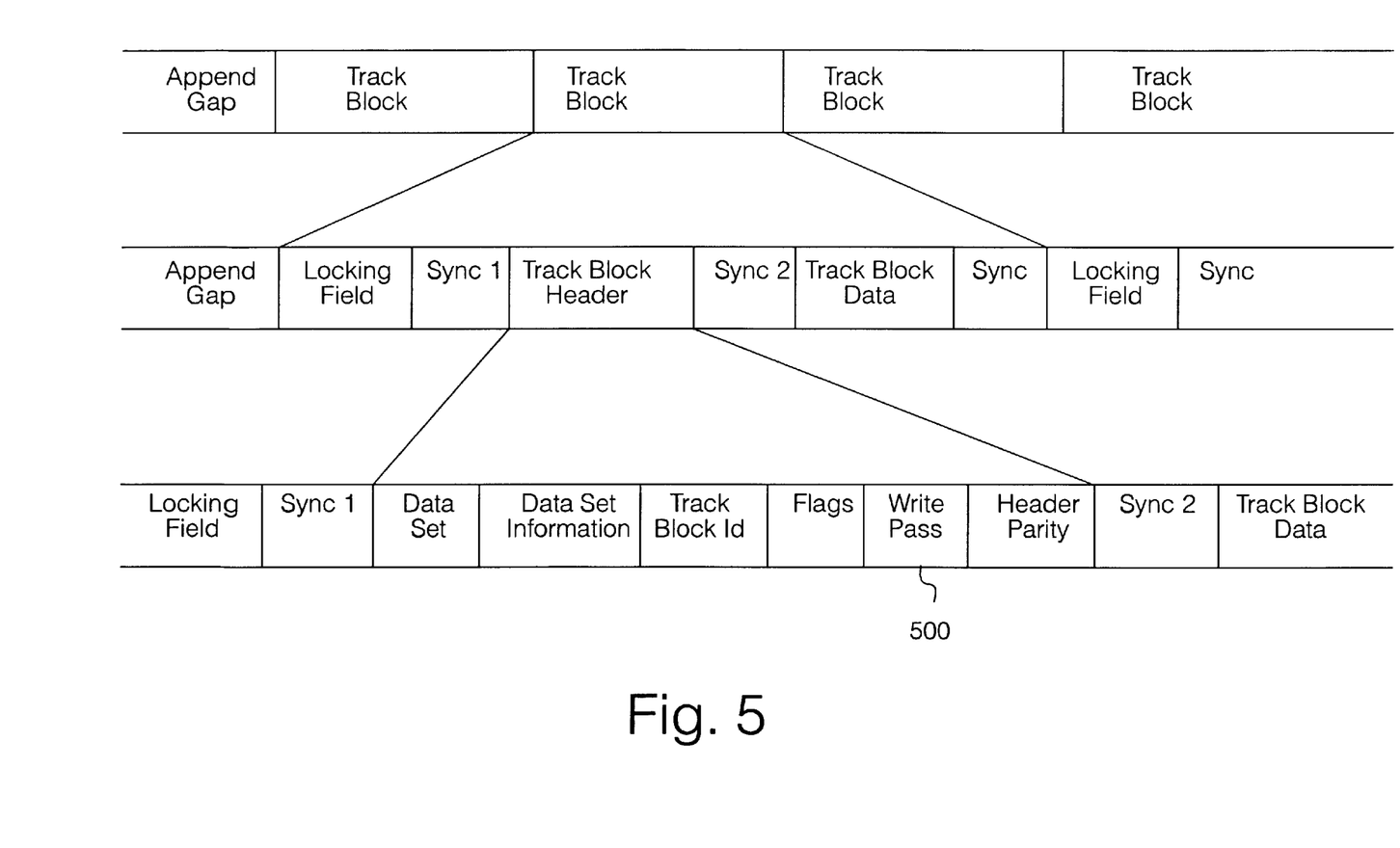
FIG. 5 illustrates schematically how each track block of data that is written to tape is sub-divided into data and header fields, the position of the Write pass identifier within the track block header is indicated.

Referring to FIG. 5 herein, there is illustrated schematically how the track block data and track block header are distributed within each track block, and also the arrangement of fields within the track block header.

In the best mode of the invention herein there is included in the track block header a data field 500, identified as write pass identifier field 500 in FIG. 5. The write pass identifier field 500 is preferably two bytes long and is initially set to have a value of 1 on a first occasion that data is written to a tape, ie onto blank formatted tape. On every subsequent occasion that data is written to tape and which causes existing data to be overwritten, unless the write operation starts at the existing end of data mark, the write pass identifier field is incremented by one. The inclusion of this field enables a particular write pass to be uniquely identified. When data is restored from tape if the write pass identifier of any particular track block is found to be at a lower value than the write pass identifier of the preceding blocks then that particular track block is determined to be from old, incompletely overwritten data or from a non-volatile memory associated with the tape cartridge. Where a first value write pass identifier is read following reading of a second value write pass identifier, and followed again subsequently by the second value write pass identifier, then the read mechanism may discriminate that there has been a write error, and that the pre-recorded data has not been fully overwritten.

Figure 6:
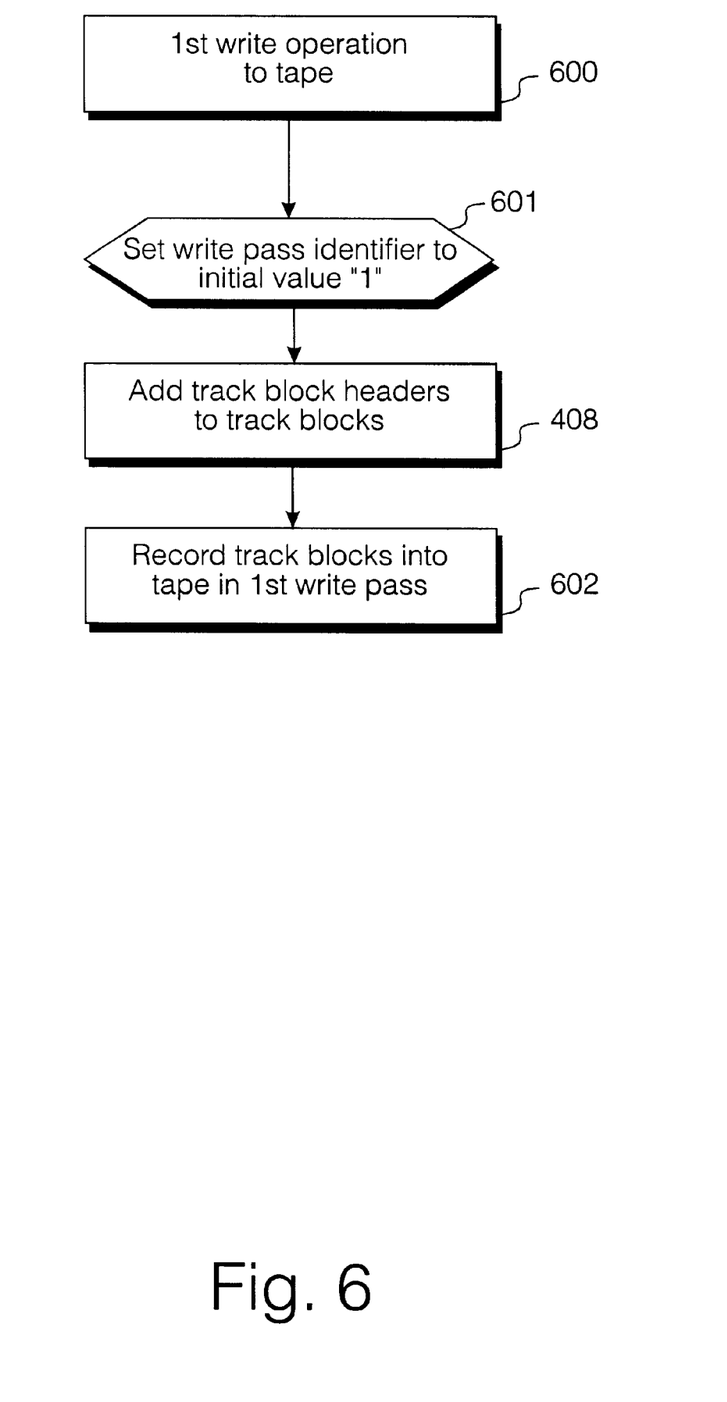
FIG. 6 illustrates schematically steps in a write operation for writing data to a tape on which formatted data has not been previously written.

Referring to FIG. 6 herein, there is illustrated schematically process steps during a first write operation of a quantity of host data to a tape. The first write operation commences in step 600 by encoding of data, addition of track block headers, etc as illustrated with reference to FIG. 4 herein. Prior to the step of adding headers in step 408, in step 601 the write pass identifier bytes 500 in the track block header are set to an initial value eg 1. The track blocks are recorded onto the tape in a first write pass in step 603.

Where the write operation stops, due to completion of the write operation, the write pass indicator is not incremented for a subsequent write operation on the same track. The purpose of the write pass indicator is to indicate a vintage of "pass" of the tape across the read/write head and thereby determine which the most recent over-write data, and which data is old pre-recorded data. The old pre-recorded data has a lower vintage (ie lower byte number) write pass identifier than the most recent over write data.

Figure 7:
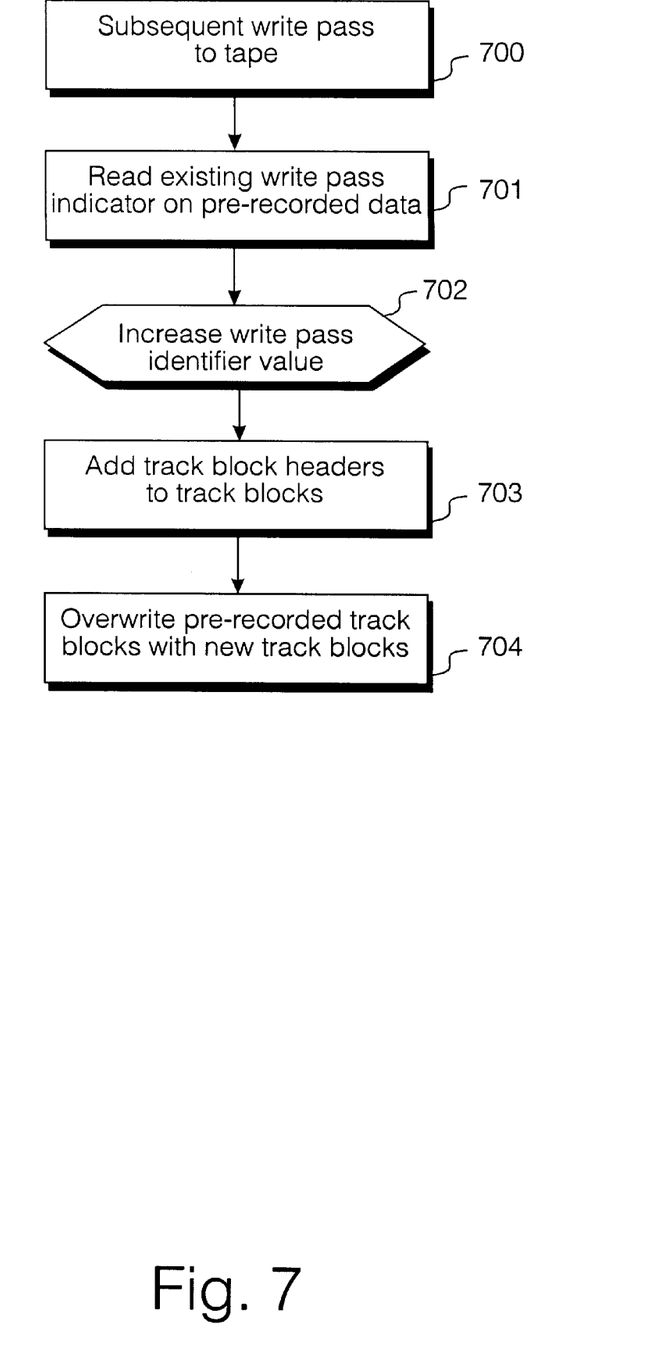
FIG. 7 illustrates schematically steps for overwriting data onto a tape on which old pre-recorded data already exists.

Referring to FIG. 7 herein, there is illustrated steps in a write operation for a subsequent write pass onto tape, overwriting old pre-recorded data on a data track. In the subsequent write pass operation 700, the existing write pass indicator of the pre-recorded data is read by read head in step 701 as the tape passes the read/write head. A write pass identifier to be added to the current over-write data is incremented in step 702 compared to the existing write pass indicator read from the pre-recorded data in step 701. The incremented write pass identifier value, indicating the current "vintage" of the data is added to the track block headers, and the track block headers are added to the track blocks in step 703. The over write data is recorded/written onto the tape in a set of over-write track blocks, which replace the pre-recorded track blocks in step 704. During the operation, data drop-out errors may occur, eg due to particles of dirt etc entering between the tape and the read/write head, so that sections of the earlier pre-recorded data are not over-written by the overwrite data. Thus, on the physical track, there may be first length of overwrite data of a recent vintage, identified by a recent vintage write pass identifier, followed by a second length of old pre-recorded data, identified by an earlier vintage of write pass identifier (ie the data drop out region), followed by a subsequent third length of physically recorded data being the most recent over write data identified by the most recent vintage write pass identifier.

Figure 8:
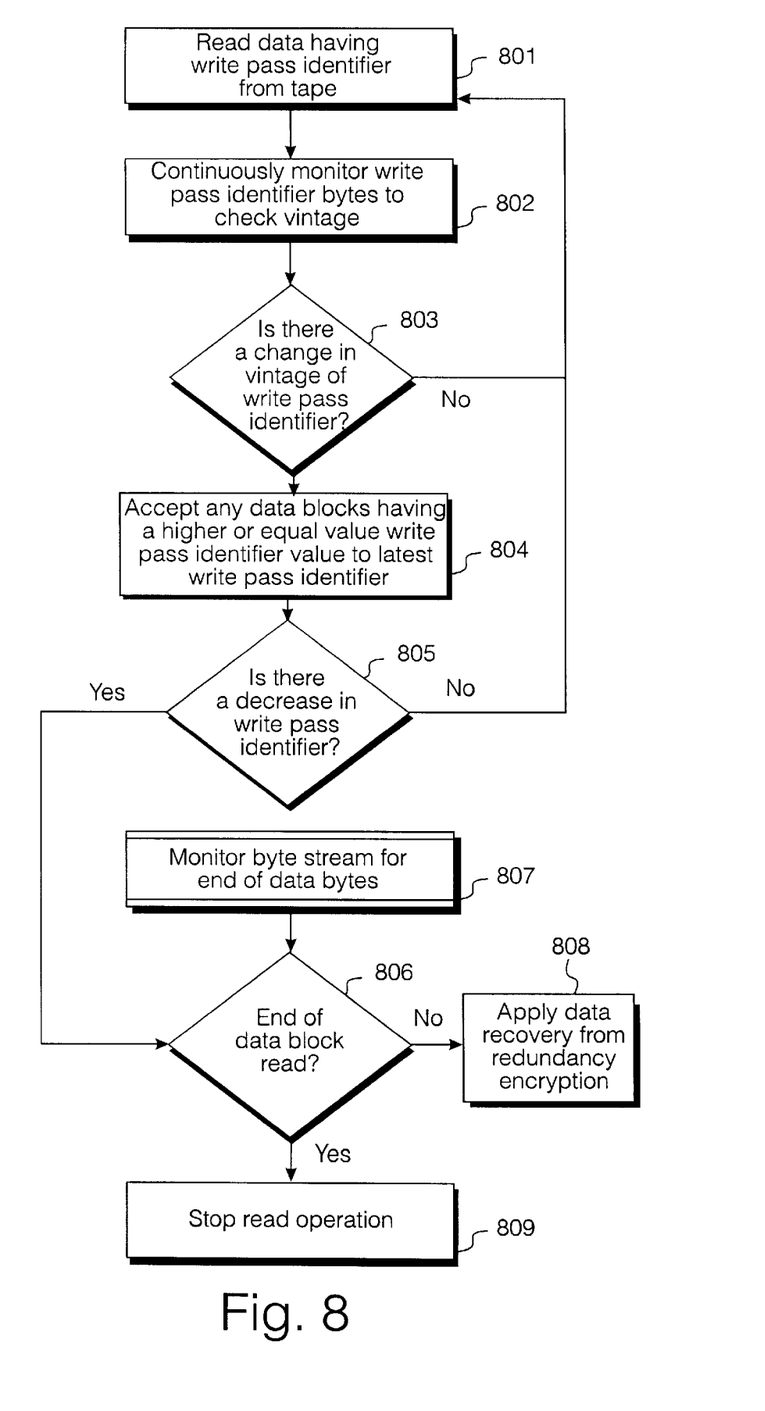
FIG. 8 illustrates schematically steps for detecting an end of data marker during a read operation of said tape.

Referring to FIG. 8 of the accompanying drawings, there is illustrated schematically steps carried out in a read operation of data from the tape. A read head scans the tape and reads data in step 801 along with corresponding write pass identifiers. The write pass identifier bytes are continuously monitored in step 802, and checked to ensure that the write pass identifier bytes remain constant, indicating that the data is all of the same vintage, ie the most recent vintage. In step 803, as long as there is no change in vintage of the write pass identifier bytes, data continues to be read in step 801. If there is a change in vintage of the write pass identifier, then there are read any data blocks which have a higher write pass indicator value to that last accepted. However, if the write pass identifier changes vintage to a lower vintage, this is detected in step 805, then it is determined whether an end of data block has been read in step 806. Monitoring the byte stream for the end of data block continues in parallel with the write pass identifier monitoring, in process 807. The end of data block is continuously monitored to see if the current write operation is ended. If there is a change in vintage of write pass identifier in step 803 but an end of data block has not been read in step 806, this is indicative of a data drop out, and data recovery from the encrypted redundancy coding is initiated in step 808. However, if an end of data block has been read, then the change in vintage of the write pass identifier is determined to be due to the end of the recorded most recent overwrite data, and the read operation is terminated in step 809.

By indicating the transition between the most recently written data and older data on tape, the write pass identifier can be used to indicate and verify the current end of data on the tape where the end of data marker block has become obliterated. If no valid end of data block exists on the tape, then end of data may be determined when the write pass identifier is seen to persist at a lower value than the previous valid data blocks.

During a read operation data blocks are accepted having a plurality of write pass identifier values, as long as the following conditions apply:

1. Within a data set, the write pass identifier values of all track blocks are the same. If, when reading a data set, the value of write pass identifier changes, and the new value of a currently read write pass identifier corresponding to currently read data is higher than a previous value of write pass identifier, corresponding to previously read data, then all data which has been read having the previous, lower write pass identifier number is discarded.

2. When the value of write pass identifier value which has been read from the tape changes during a read operation, only data corresponding to currently read write pass identifier values which are greater than values of previously read write pass identifiers are accepted. Any data corresponding to currently read write pass identifier values having a value lower than previously read write pass identifier values are discarded.

Sequences of a plurality of data blocks having a corresponding write pass identifier values of more than one value can be accepted during a read operation, as long as the above two conditions are obeyed.

Similarly, during a recording operation

1. In a data set, the written write pass identifier values should be the same throughout the data set; and 2. When the value of write pass identifier is changed, during a recording operation, the value is only allowed to increment to be greater than a previously used write pass identifier value.

What is claimed is:

1. A method of writing data to a data storage medium, said method comprising the steps of:

writing to said data storage medium,
  for each of said writing steps, writing an identifier capable of being incremented to said data storage medium, said identifier uniquely identifying said write operation;

wherein said data are written in sets of data blocks, an end of one of said sets of data blocks being marked by recording an end of data indicator; and incrementing a value of said identifier compared to an identifier of a previous one of said write operations when data which are written to said data storage medium cause existing pre-recorded data to be overwritten, unless the write operation starts at an existing end of a data indicator on said data storage medium.

2. The method as claimed in claim 1, wherein said data storage medium comprises an elongate tape, and one of said write operations comprises a write pass along a length of said tape.

3. The method as claimed in claim 1, comprising:
performing a plurality of said write operations in a sequence, wherein for each of said write operations a corresponding respective unique one of said identifiers is assigned, and identifying said write operation.

4. The method as claimed in claim 1, wherein a first of said write operations having a first of said identifiers is overwritten by a second of said write operations having a second of said identifiers, wherein said second identifier is incremented in value with respect to said first identifier.

5. The method as claimed in claim 1, wherein said written data are partitioned into a set of data blocks, and one of said identifiers is included in each of said data blocks.

6. A method of formatting data recordable on a data storage medium so as to include information relating to a vintage of said data, said method comprising steps of:

arranging a byte stream of data into a plurality of data blocks; and adding a data block header to each of said data blocks, wherein said data block header uniquely identifies a vintage of said recorded data, such that on an occasion that data are written to said data storage medium which cause existing pre-recorded data on said data storage medium to be overwritten, an identifier data field within said data block header is incremented.

7. The method as claimed in claim 6, wherein said identifier field contains data identifying a write pass operation.

8. The method as claimed in claim 6, wherein said data storage medium comprises a magnetic tape.

9. A tape data storage device capable of writing data to a tape data storage medium, wherein:

said device is operable to perform a write operation to write data to said tape data storage medium; and for each said write operation, said device is operable to write an incrementable identifier to said data storage medium, said identifier uniquely identifying said write operation, said device being arranged so that when it writes data to said data storage medium which cause existing pre-recorded data to be overwritten, unless the write operation starts at an existing end of a data indicator on said data storage medium, a value of said identifier is incremented.

10. A method of encoding data written to tape so as to distinguish over-write data from pre-recorded data, said method comprising the steps of:

reading a first write pass identifier of said pre-recorded data already recorded on tape;

arranging a byte stream of said overwrite data into a plurality of data blocks;

to each data block, adding a block header including a second write pass identifier identifying a write operation in which said data are over-written on said pre-recorded data, incrementing said second write pass identifier of said overwrite data compared to said first write pass identifier of said pre-recorded data, such that on every subsequent write operation occasion that data are written to said tape, after said pre-recorded data, unless the subsequent write operation starts at an end of said pre-recorded data, said second write pass identifier is incremented.

11. An encoding device capable of encoding data written to tape so as to distinguish overwrite data from pre-recorded data, wherein said encoding device comprises:

means operable to read a first write pass identifier of said pre-recorded data already recorded on tape;

means operable to arrange a byte stream of said overwrite data into a plurality of data blocks;

means operable to add a block header to each data block, said block header containing a second write pass identifier identifying a write operation in which said data are overwritten on said pre-recorded data, wherein said second write pass identifier of said overwrite data is incremented compared to said first write pass identifier of said pre-recorded data, such that on a subsequent write operation occasion that data are written to said tape, after said pre-recorded data, unless the subsequent write operation starts at an end of said pre-recorded data, said second write pass identifier is incremented in value.

12. A method of reading data from a tape data storage medium, said method comprising the steps of:

reading a stream of said data from said tape data storage medium;

continuously monitoring an identifier embedded in said read data;

monitoring said stream of data for an end of data indicator;

determining whether a change in vintage value of said continuously monitored identifier occurs;

accepting any of said data associated with a currently read identifier having the same or a more recent vintage value as a previously read identifier;

if said currently read identifier has an earlier vintage value, compared to said previously read identifier data, then:

if no end of data indicator has been found in said data stream, initiating a data recovery operation from a redundancy encryption code embedded in said stream of data; and if an end of data indicator has been found in said stream of data, terminating reading of said stream of data from said data storage medium.

13. An encoding device for encoding data written on a tape and for distinguishing overwrite data on the tape from data pre-recorded on the tape, the encoding device comprising:

a reader for reading a first write pass identifier of the pre-recorded data, a data processor arrangement for: (a) arranging a byte stream of the data to be overwritten into the tape into plural data blocks, (b) adding a block header to each of the data blocks, the block header containing a second write pass identifier identifying a write operation in which said data are overwritten on said pre-recorded data, (c) incrementing the second write pass identifier of said overwrite data compared to said first write pass identifier of the pre-recorded data, the incrementing being such that on a subsequent write operation occasion that data are written to said tape, after said pre-recorded data, unless the subsequent write operation starts at an end of said pre-recorded data, said write second pass identifier is incremented in value.

* * * * *